United States Patent [19]

Oskam et al.

[11] 4,101,206

[45] Jul. 18, 1978

[54] ADJUSTABLE MOTOR CAR MIRROR WITH COMPACT ELECTRICALLY DRIVEN ADJUSTING MEANS

[75] Inventors: Aane Adriaan Oskam, De Meern; Hermanus Marinus Ignatius Koot, Linschoten, both of Netherlands

[73] Assignee: Industrie Koot B.V., Montfoort, Netherlands

[21] Appl. No.: 751,709

[22] Filed: Dec. 17, 1976

[30] Foreign Application Priority Data

Apr. 9, 1976 [NL] Netherlands .................. 7603821
Sep. 14, 1976 [NL] Netherlands .................. 7610173

[51] Int. Cl.² .................. G02B 5/08; G02B 7/18
[52] U.S. Cl. .................. 350/289
[58] Field of Search .................. 350/289; 74/501 M

[56] References Cited

U.S. PATENT DOCUMENTS

Re. 27,653  5/1973  Oskam .................. 350/289

Primary Examiner—Jon W. Henry

[57] ABSTRACT

An apparatus for adjusting a mirror or a similar flat planar element about two mutually perpendicular axes. The apparatus has a housing enclosing a reversible motor, an electromagnetically operated clutch and two planetary transmission assemblies, one for each direction of movement. The clutch selectively couples the motor to one or the other of the two pinion sun wheels of the planetary transmission systems. The drive shaft of each planetary transmission assembly is provided with crank arm, which engages a corresponding mirror adjustment unit. A mirror mounting plate is provided with recesses into which correspondingly shaped parts of the mirror adjustment units are introduced by snap fitting.

12 Claims, 12 Drawing Figures

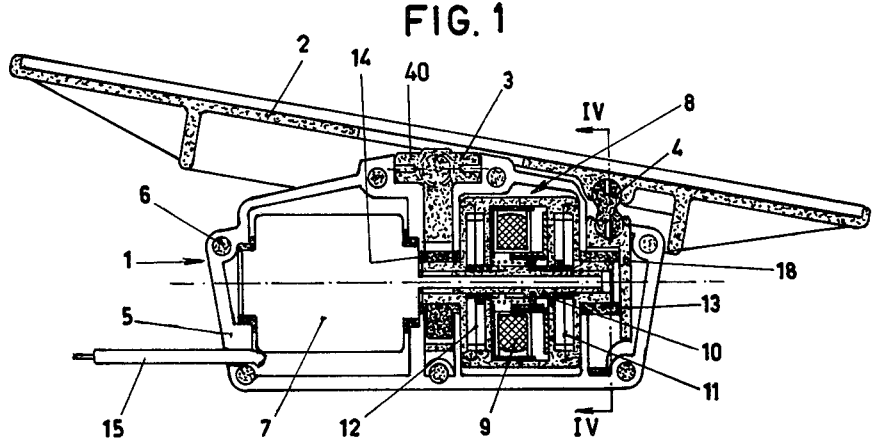
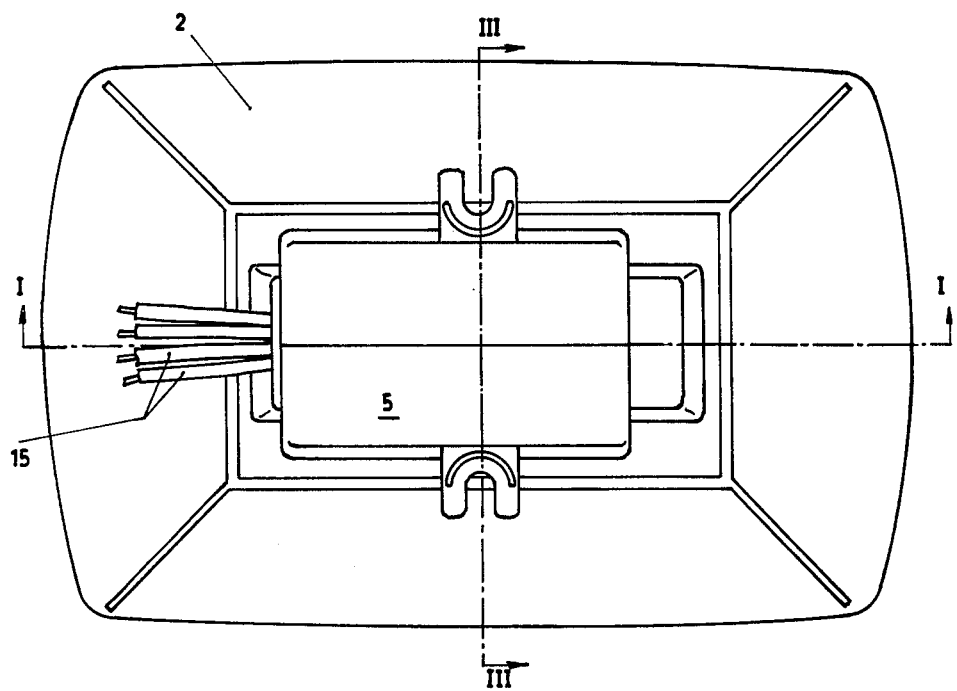

ADJUSTABLE MOTOR CAR MIRROR WITH COMPACT ELECTRICALLY DRIVEN ADJUSTING MEANS

The invention relates to a device for adjusting a motor car mirror about two mutually perpendicular axes, consisting principally of a housing enclosing a reversible motor, an electromagnetically operated clutch and two planetary transmission assemblies, one for each direction of movement.

Such devices are disclosed in U.S. Pat. No. 3,552,836 and copending U.S. patent application Ser. No. 732,292 in the name of the present applicant.

These known devices are provided with a mounting plate to which the actual motor car mirror can be attached, the mounting plate being adjustable by means of cables running from the adjustment mechanism via a number of guiding means to the mounting plate for the mirror.

The adjustment of the mirror is effected by applying traction to the cables, causing the mirror to pivot about one or the other of two perpendicularly disposed axes.

These known devices have the disadvantage that the fitting of the cables required to bring about the pivotal movement is troublesome and time-consuming and therefore costly. This work is further complicated by the necessity of providing the cables with a number of guiding means. Moreover, the mounting plate for the mirror forms an integral part of the actual adjustment mechanism, so that the whole is too bulky to be used, for example, on small motor cars. A further objection is that the work of attaching the mirror to the mounting plate is too labour-intensive.

The aim of the present invention is to provide a device for adjusting a motor car mirror about two mutually perpendicular axes, such device not being subject to the above-mentioned objections, while being of such compact construction that the space occupied by the adjustment mechanism is as small as possible.

According to the invention, this aim is achieved by the provision of a device of the above-described kind, characterized in that the drive shaft of each planetary transmission assembly is provided with a projection member which engages a corresponding mirror adjustment unit. In this manner, the forces required to adjust the mirror can be directly transmitted to adjustment means for the mirror mounting plate, so that the cable system and the necessary guiding means, with their attendant problems, can be dispensed with.

According to the invention, each projection member is preferably a crank arm and is mounted on the drive shaft of the respective planetary transmission assembly by means of a slip coupling.

In a preferred embodiment, the mirror adjustment unit for adjusting the mirror about the longitudinal axis is located in the compartmented housing of the device, between the motor and the combined clutch/transmission mechanism, this mirror adjustment unit consisting of a disk-shaped element with a substantially heart-shaped aperture, inside which aperture the crank-arm engages the lower part of the disk-shaped element, while the upper part of this element takes the form of a cross-piece, of which the two shorter members extending in the direction of the longitudinal adjustment axis are enclosed within the housing, while the two longer members extend outside the housing.

The mirror adjustment unit for adjusting the mirror about the axis perpendicular to the longitudinal axis is of corresponding construction and is located on the side of the combined clutch/transmission mechanism opposite to the motor, while the upper part of this mirror adjustment unit is provided with an extension which projects outside the housing.

According to the invention, the parts of both mirror adjustment units which project outside the housing of the device form mounting points for the mirror mounting plate and these projections can be snap fitted into corresponding recesses in this plate.

The compactness of the device is further improved, according to the invention, by the fact that the axes of the driving motor, the clutch and the planetary transmission assemblies are in line with each other. Moreover, the clutch and the planetary transmission assemblies are located in a common, cylindrical housing, the two planetary transmission assemblies being at either extremity of this housing, while between them are mounted the coil for activating the clutch, the magnetic core and means for coupling the motor with one or the other of the planetary transmission assemblies.

The invention is further concerned with an adjustable motor car mirror consisting essentially of a mounting plate to which the mirror is bonded, this mirror being characterized by the fact that the underside of the mounting plate is provided with recesses into which the parts of the device projecting outside the housing are introduced by snap fitting for the purpose of adjusting the mirror about two mutually perpendicular axes.

Embodiments of the device according to the invention are described in detail below in conjunction with the drawings, in which :

FIG. 1 is a longitudinal cross-section of the device according to the invention, taken along the line I—I of FIG. 2, with the mirror mounting plate mounted obliquely on the device;

FIG. 2 is a bottom plan view of the device;

Figure 6:
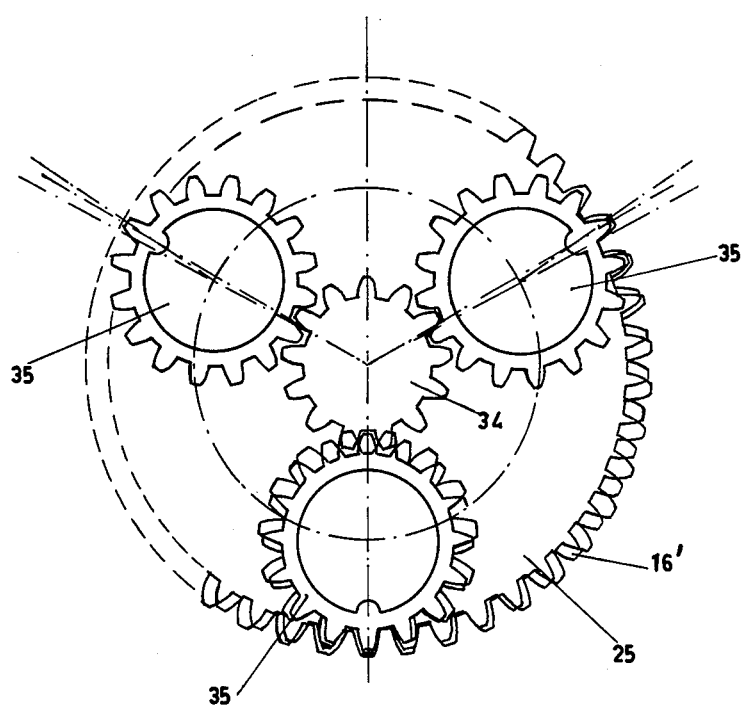
Figure 7:
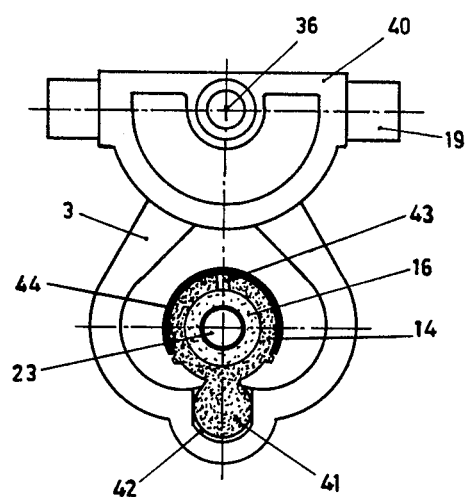
Figure 9:
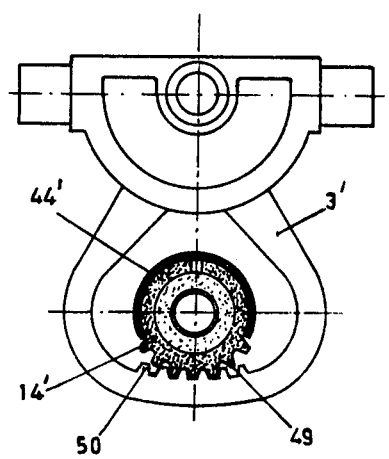
Figure 10:
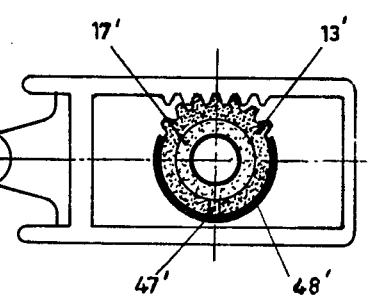
Figure 11:
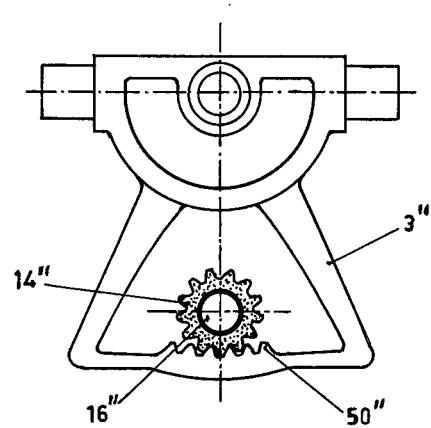

FIG. 6 is a schematic view of a planetary transmission assembly employed in the device according to the invention; and FIGS. 7–12 are end elevation views of alternative embodiments for the activation of the mirror adjustment units, FIGS. 7, 9 and 11 corresponding to FIG. 3, and FIGS. 8, 10 and 12 to FIG. 4. In FIG. 1, the device 1 according to the invention has a mirror mounting plate 2 secured by snap connections to the cross-piece 40 of the first mirror adjustment unit 3, projecting outside the device 1 and to the projection 4 of the second mirror adjustment unit 18, located at one end of the device 1. In the drawing plane, the housing 5 is divided into two sections which are joined together by a number of pins 6. The housing 5 contains the motor 7 and the cylindrical housing 8, in which both the clutch and the planetary transmission assemblies are located. This cylindrical housing 8 also contains a coil 9 to displace the magnetic core 10, as a result of which either the planetary transmission assembly 11 at one end of the housing 8 or the planetary transmission assembly 12 at the other end of the housing 8 is brought into operation.

A projection member in the form of a crank arm 13 is pressed onto the drive shaft or hub of the planetary transmission assembly 11 in such a manner that it can slip upon the hub. A projection member in the form of a crank arm 14 is likewise pressed onto the drive shaft or hub of the planetary transmission assembly 12 and can also slip upon the hub. The electric power leads for the motor 7 and the coil 9 are numbered 15.

Figure 3:
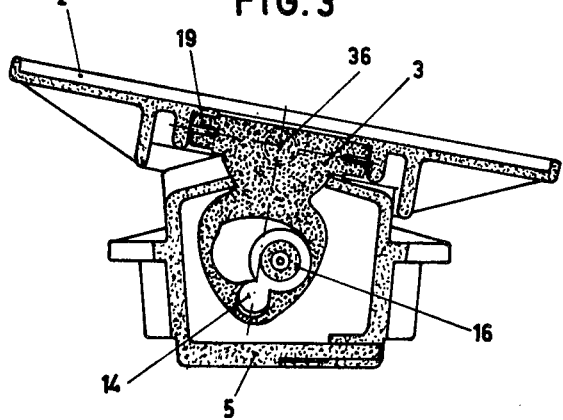
FIG. 3 is a cross-section taken along the line III—III of FIG. 2, with the mirror in a position different from that shown in FIG. 1.

FIG. 3 illustrates the manner in which the mounting plate 2 can be adjusted about one axis of the mirror. As already indicated, the crank-shaped dog 14 is pressed onto the drive shaft or hub 16 of the planetary transmission assembly 12 so as to be able to rotate with the hub 16. The extremity of the crank engages in an aperture in the mirror adjustment unit 3 and causes the latter to pivot around the axis 36.

The upper part of the mirror adjustment unit 3 is in form of a cross-piece 40, having members extending in the direction of the longitudinal adjustment axis 36 of the mirror 2 which are enclosed within the housing 5 (see FIG. 5), and members 19 which are perpendicular to the adjustment axis 36 projecting outside the housing 5. The extremities of these members 19 are fashioned in such a manner that the mirror mounting plate 2 can be snap fitted upon them by means of corresponding recesses in the mirror mounting plate.

When the mirror has been pivoted through a certain angle, the mounting plate 2 will come to rest against the housing 5. If the shaft or hub 16 of the planetary transmission assembly 12 continues to be driven with the mirror in this position, the crank-arm 14 will commence slipping on the hub 16. This slipping is also of importance when a force, for example, a blow, is delivered to the mirror mounting plate 2 which is not intended to be transferred to the planetary transmission assembly 12. The transmission can thus not be damaged by forces exerted on the mirror.

Figure 4:
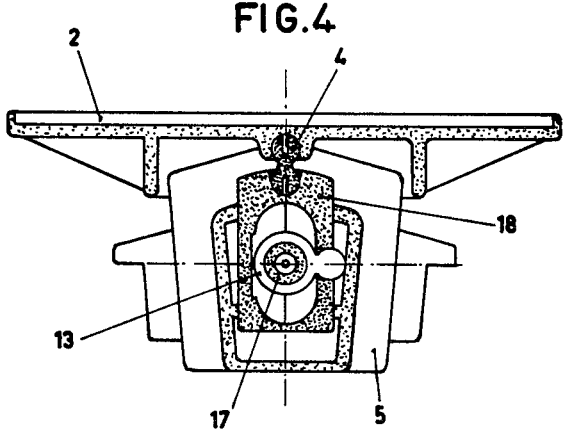
FIG. 4 is a cross-section taken along the line IV—IV of FIG. 1.
Figure 5:
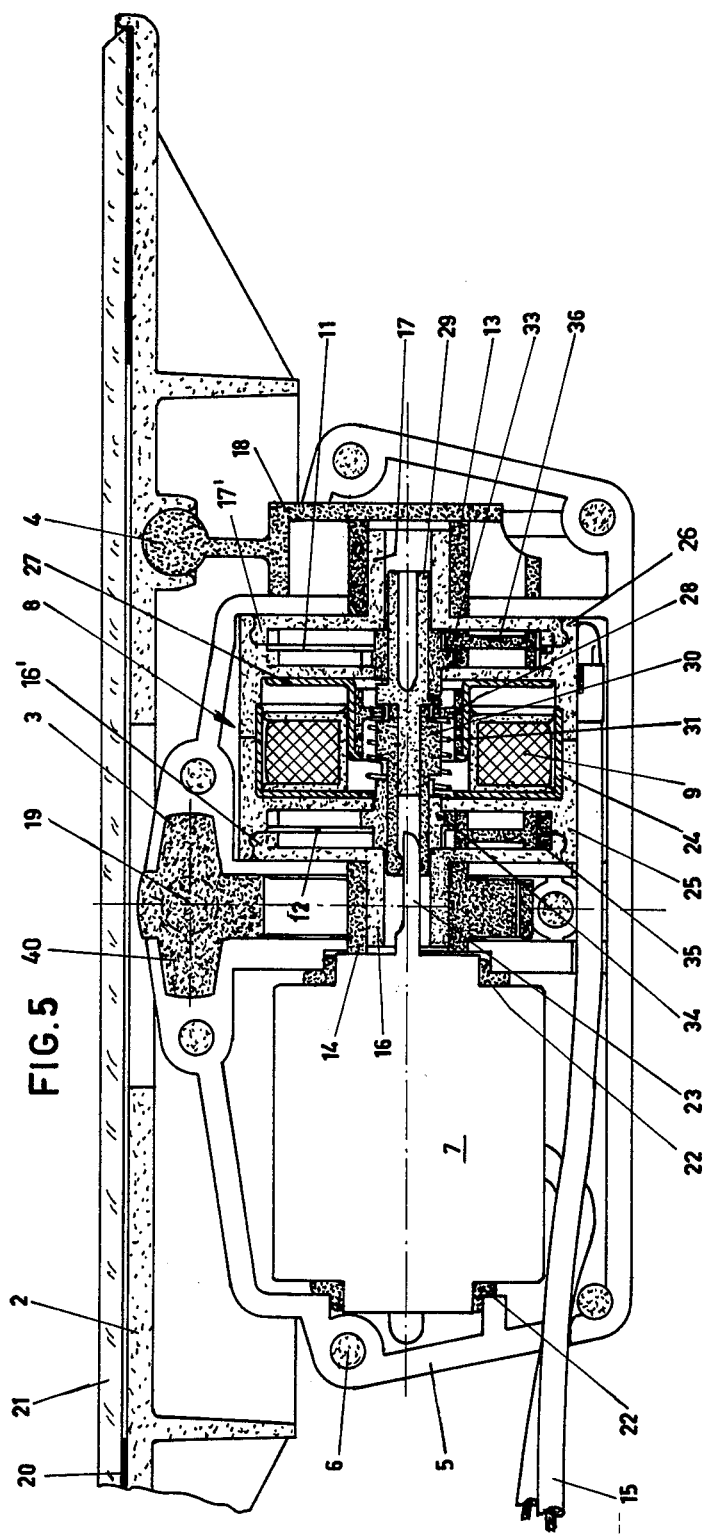
FIG. 5 is a cross section similar to FIG. 1, on an enlarged scale, with the mirror in the upright position.

FIG. 4 illustrates a similar arrangement for adjusting the mirror about an axis perpendicular to the longitudinal axis. Since the second mirror adjustment unit 18 is not located in the center of the mirror, this unit must be capable of oscillation in the vertical direction (see FIG. 1). This requirement is achieved by mounting the second mirror adjustment unit in the housing 5 for sliding movement toward and away from the mirror, and by providing the crank arm 13, which is pressed onto the drive shaft or hub 17 of the planetary transmission assembly 11, this arm 13 being horizontally (in FIG. 1) when the mirror is in the neutral position and engaging in an aperture in the mirror adjustment unit 18. When the arm 13 is rotated, the mirror adjustment unit 18 is caused to move upwards or downwards in the vertical direction (in FIG. 1), this movement being transmitted to the mirror through the projecting element 4. This element 4 is engaged by snap filling into a corresponding recess in the mirror mounting plate 2. As shown in FIG. 5, the element 4 can be an integral part of the mirror adjustment unit 18.

FIG. 5 illustrates on an elongated scale the construction of the cylindrical housing 8 and the parts contained within it. The housing 8 consists of two cylindrical rings 25 and 26, while the left- and right-hand portions are occupied respectively by the planet wheel 16' of the planetary transmission assembly 12 and the planet wheel 17' of the planetary transmission assembly 11. The planet wheels 16' and 17' are able to rotate within the housing 8. This housing also contains the coil 9 and the coil casing 24, which are retained by the rings 25 and 26 of the housing 8.

The motor 7 is secured within the housing 5 by means of the centering rings 22, while the drive shaft 23 of the motor 7 is coupled to the interlocked parts 29 and 30 of the clutch shaft by a keyed connection. The clutch sleeve 28, which is pressed into the magnetic core 27, is located between the parts 29 and 30. In the drawing, this clutch sleeve 28 is shown urged to the right by the spring 31. In this position, the clutch shaft 29 is in engagement with the solar gear 33 of the planetary transmission assembly 11. When the coil 9 is activated, the magnetic core 27 is caused to move to the left, so that the clutch shaft 30 engages the solar gear 34 of the planetary transmission assembly 12. By the above means, the mirror is either adjusted about an axis perpendicular to the drawing plane by the upward or downward movement of the mirror adjustment unit 18, or it is adjusted about an axis lying in the drawing plane when the solar gear 34 is driven. Since the motor 7 can be driven reversibly, the mirror plate 2 can pivot on either axis in two directions. The unengaged solar gear can rotate freely on the clutch shaft 29, 30.

The planetary transmission assemblies 11 and 12 are duplicates and make it possible to achieve a gearing reduction of 3000:1. This is achieved in the following manner (see also FIG. 6). The solar gear 34 is in engagement with three satellite gears 35 which are each provided with a double set of teeth, which differ slightly, for example by one tooth, in the number of teeth they present. The set of teeth of the satillite gears 35 which is farthest to the right in FIG. 5 is in engagement with the teeth on the interior wall of the ring 25 of the housing 8. The set of teeth of the satellite gears 35 which is farthest to the left in FIG. 5 is in engagement with the teeth on the inside of planet gear 16', the number of which differs slightly from the number of teeth on the interior wall of the ring 25 of the housing 8. When the solar gear 34 is driven, and because the ring 25 is stationary, the satellite gear 35 will roll over the teeth on the interior wall of this ring 25. Since these satellite gears 35 are also in engagement with the teeth borne by the planet gear 16' via the second set of teeth borne by these satellite gears 35, the planet gear 16' will be displaced by the angular equivalent of one tooth with respect to the ring 25 for every revolution of the satellite gears 35, because there is a difference of one in the number of teeth presented by the two sets of teeth of each satellite gear. In this manner, the substantial gearing reduction mentioned above is achieved.

The planetary transmission assembly 11 is identical to the planetary transmission assembly 12 described above.

As indicated in FIG. 5, the motor car mirror, consisting of the mirror mounting plate 2 and the actual mirror 21 bonded to it by an adhesive layer 20, can be snap fitted onto those parts 4 and 19 of the mirror adjustment units 3 and 18 which project outside the device 1.

The above arrangement has the additional advantage that, in the event of the mirror adjustment device becoming defective, the mirror itself can be mounted on a new adjustment device, while, in the opposite case of the mirror becoming unserviceable, only the mirror, not the device for adjusting it, need be replaced. By arranging for all major components, such as the motor 7 and the cylinrical housing 8 with the clutch and the planetary assemblies, to be in line with each other, the volume of the device can be reduced significantly, which means that the protective casing for the device, to be mounted on motor cars, can be advantageously of smaller dimensions and therefore lighter in construction.

The FIGS. 7–12 illustrate alternative embodiments for the activation of the mirror adjustment units, FIGS. 7, 9 and 11 corresponding to FIG. 3, and FIGS. 8, 10 and 12 to FIG. 4.

In FIG. 7, the mirror adjustment unit 3 is shown before the mirror is caused to pivot about the adjustment axis 36, which is perpendicular to the plane of the drawing. The upper portion of the mirror adjustment unit 3 is in the form of a cross-piece 40, on the longer members 19 of which the mirror (not shown) can be mounted. Within the substantially heart-shaped aperture in the mirror adjustment unit 3 is located the arm 14, which is pressed onto the protruding drive shaft or hub 16 of a planetary transmission assembly. This hub 16 is coupled to the motor drive shaft 23 by means of a keyed connection. The arm 14 has a projecting part 41, which is received into a corresponding aperture 42 in the internal wall of the mirror adjustment unit 3.

When the hub 16 is caused to rotate, the mirror adjustment unit 3 will be pivoted about the axis 36 by means of the arm 14, the projecting part 41 and the walls of the aperture 42. When the mirror has reached the end of its travel, determined by stops, slip must be arranged to occur somewhere in the series of connections hub 16 — arm 14 — mirror adjustment unit 3, for example, between the hub 16 and the arm 14. In order to ensure that this slip does not occur prematurely, for example, as a result of excessive tolerances in the connection between the hub 16 and the arm 14 or of expansion differences due to temperature changes, a spring 44, preferably of steel, is slid over the annular portion of the arm. The modulus of elasticity of this spring 44 provides a means for accurately determining the slip between hub 16 and arm 14. The arm 14 is naturally provided with a groove at 43.

Figure 8:
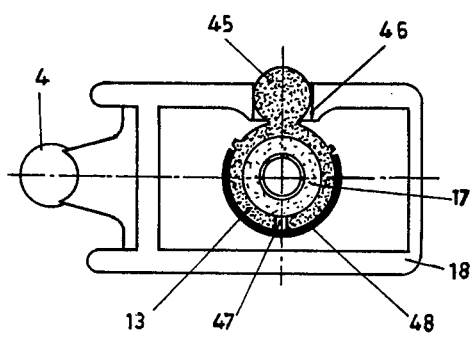

FIG. 8 is turned through 90° with respect to FIG. 4. The hub of the planetary transmission assembly 11 is indicated by 17. The arm 13 is pressed onto the hub 17. The projecting part 45 of the arm 13 is received in the aperture 46 in the wall of the mirror adjustment unit 18. The projecting element 4 is snap fitted into a corresponding recess in the mirror (not shown). The locking spring slid over the arm 13 is indicated by 48.

FIG. 9 differs from FIG. 7 only in the manner in which the mirror adjustment unit 3' is activated by the arm 14'. The arm 14' is provided, over a part of its circumference, with a set of teeth 49, which engage corresponding teeth 50 on the mirror adjustment unit 3'. An elastic locking device 44' is again used.

FIG. 10 shows the arrangement shown in FIG. 8 provided with the activating system shown in FIG. 9, so that the mode of operation will require no further comment.

FIG. 11 differs from FIG. 9 in that the slip no longer occurs between hub 16" and arm 14", but between member 14" and the teeth 50" on the mirror adjustment unit 3". The member 14", in this case a cogwheel, can therefore be secured on the drive shaft or hub 16" of a planetary transmission assembly. The "legs" of the mirror adjustment unit 3" must be of flexible material, so that the cogwheel 14" is able to urge the teeth 50" outwards, i.e. downwards in the plane of the drawing, as soon as the mirror adjustment unit 3" has reached its end position, that is to say, once the mirror mounted on the unit 3" is arrested by its stops. In this situation, the teeth of the cogwheel 14" slip over the teeth 50"

Figure 12:
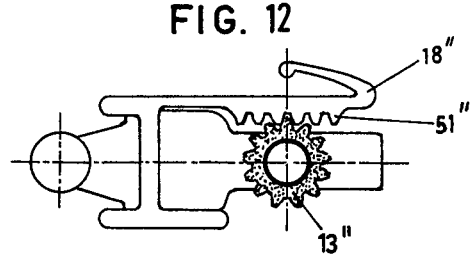

This also happens in the arrangement shown in FIG. 12. The mirror adjustment unit 18" here has an "open" form, consisting principally of a rack 51", which, shaped as shown, is readily urged outwards out of engagement with the teeth on the dog 13".

We claim:

1. A device for adjusting a motor car mirror around two substantially perpendicular axes, comprising a housing, a reversible motor in said housing, an electromagnetically operated clutch in said housing and connected to said motor, two planetary transmission assemblies in said housing and to which said clutch is connected for operating one or the other of said transmission assemblies, each transmission assembly having a drive shaft, a projection member mounted on each drive shaft, and two mirror adjustment units, one having one end connected to said projection member on said drive shaft of one transmission assembly and having the other end adapted to be connected to a mirror structure for tilting said mirror structure around one of said axes, and the other having one end connected to said projection member on said drive shaft of the other transmission assembly and having the other end adapted to be connected to the mirror structure for tilting the mirror structure around the other of said axes, one of the connections between the drive shaft and the projection member and between the projection member and the mirror adjustment unit for each combination of drive shaft, projection member and mirror adjustment unit being a slip connection.

2. A device as claimed in claim 1 in which each projection member is a crank arm and is mounted on said drive shaft for slippage relative to said drive shaft when the load between said drive shaft and said crank arm exceeds a predetermined value and has the other end thereof in a ball and recess connection with the corresponding adjustment unit.

3. A device as claimed in claim 2 in which said clutch and transmission assemblies are integrated into a single unit and said one mirror adjustment unit is positioned in said housing between said motor and said integrated unit, said adjustment unit being a disk-shaped element having a substantially heart-shaped aperture therein, said crank arm being inside said aperture and engaged with the part of the disk-shaped element on the opposite side of said drive shaft from the mirror structure, the part of said disk-shaped element toward said mirror structure having a cross-plate with two members extending in the direction of the axis around which said one mirror adjustment unit tilts the mirror structure and being pivotally mounted in said housing and two further members extending perpendicularly to said first mentioned two members and extending out of the housing and having means for pivotally mounting the mirror structure thereon for tilting movement around an axis along said further members.

4. A device according to claim 2 in which said clutch and transmission assemblies are integrated into a single unit and said other mirror adjustment unit is positioned in said housing on the other side of said integrated unit from said motor and said other adjustment unit being a disk-shaped element having an aperture therein, said crank arm being inside said aperture and engaged with the part of the disk-shaped element on the opposite side of said drive shaft from the mirror structure, the part of said disk-shaped element toward said mirror structure projecting outside said housing and having the end adapted to be connected to said mirror structure.

5. A device as claimed in claim 2 in which each said crank arm has a split ring thereon fitted around the corresponding drive shaft, and a spring element around at least part of the circumferential surface of said split ring for providing a minimum slippage load between said arm and said drive shaft.

6. A device as claimed in claim 1 in which each projection member is a ring mounted on the corresponding drive shaft for slippage relative to the drive shaft when the load between the drive shaft and said ring exceeds a predetermined value, and a plurality of teeth only a part of the periphery of said ring, each adjustment unit having an aperture therein in which said ring is located and having teeth on a part of the inside of said aperture meshed with the teeth on said ring.

7. A device as claimed in claim 6 in which each said ring is a split ring fitted around the corresponding drive shaft, and a spring element around at least a part of the circumferential surface of the split ring for providing a minimum slippage load between said ring and said drive shaft.

8. A device as claimed in claim 1 in which each projection member is a ring fixedly mounted on the corresponding drive shaft and having teeth around the entire circumference thereof, and each mirror adjustment unit is plate-shaped element of flexible material and having an opening therein with a portion of the edge defining said opening having teeth thereon for meshing with the teeth on said ring, the portion of said edge being forced to flex away from said toothed ring when said adjustment unit moves the mirror structure to the limit of said movement and said drive shaft keeps rotating for causing the teeth on said toothed ring to ride over the teeth on said adjustment unit.

9. A device as claimed in claim 1 in which the axes of said motor, said clutch and said transmission assemblies are in line with each other.

10. A device as claimed in claim 9 further comprising a common cylindrical housing having said two planetary transmission assemblies at opposite ends thereof and said clutch is between said transmission assemblies and has a spring biassed clutch member and a magnetic core for moving said clutch member against the bias of the spring for coupling the motor with one or the other of the planetary transmission assemblies.

11. A device as claimed in claim 1 in which said adjustment units each having on the end thereof which is adapted to be attached to the mirror structure a part of a snap fitting connection for connecting with a mating part on the mirror structure, whereby the mirror structure can be snap fitted onto the adjusting device.

12. A device for adjusting a motor car mirror around two substantially perpendicular axes, comprising a housing, a reversible motor in said housing, and electromagnetically operated clutch in said housing and connected to said motor, two planetary transmission assemblies in said housing and to which said clutch is connected for operating one or the other of said transmission assemblies, each transmission assembly having a drive shaft, a projection member mounted on each drive shaft, two mirror adjustment units, one mirror adjustment unit having one end connected to said projection member on said drive shaft of one transmission assembly, a plate-shaped mirror structure mounted on the other end of said one mirror adjustment unit for tilting movement around one of said axes and movable around the other of said axes by movement of said one mirror adjustment unit, and the other mirror adjustment unit having one end connected to said projection member on said drive shaft of the other transmission assembly and having the other end connected to the mirror structure for tilting the mirror structure around said one axis, one of the connections between the drive shaft and the projection member and between the projection member and the mirror adjustment unit for each combination of drive shaft, projection member and mirror adjustment unit being a slip connection, the said other ends of said mirror adjustment units each having one part of a snap fitting thereon and said mirror structure having mating parts thereon for snap fitting the mirror structure onto the mirror adjustment units.

* * * * *